J. E. MEYLAN.
ANTIFRICTION BEARING FOR VEHICLE WHEELS.
APPLICATION FILED DEC. 12, 1912.
1,128,617.
Patented Feb. 16, 1915.
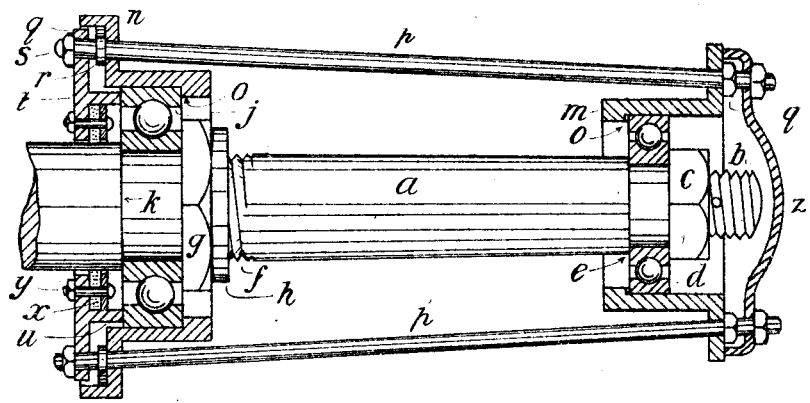
– FIG 1 –
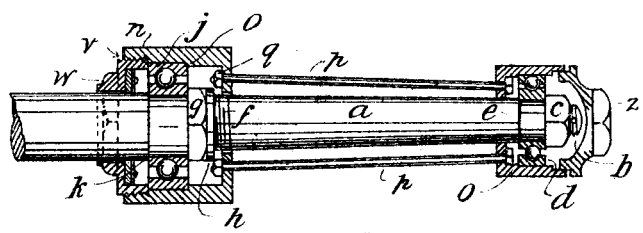
– FIG 2 –
Inventor
Jules Élie Meylan

UNITED STATES PATENT OFFICE.

JULES ELIE MEYLAN, OF EAST ADELAIDE, SOUTH AUSTRALIA, AUSTRALIA.

ANTIFRICTION-BEARING FOR VEHICLE-WHEELS.

1,128,617. Specification of Letters Patent. Patented Feb. 16, 1915.

Application filed December 12, 1912. Serial No. 736,240.

*To all whom it may concern:*

Be it known that I, JULES ELIE MEYLAN, subject of the King of Great Britain, residing at Second avenue, East Adelaide, in the State of South Australia, Commonwealth of Australia, have invented certain new and useful Improvements in Antifriction-Bearings for Vehicle-Wheels, of which the following is a specification.

My invention relates to improvements in and connected with hubs and axles for vehicles, the object of the same being to so construct and arrange the working parts that easy running of a vehicle is obtained without sacrificing the strength of the working parts, and the side strain incidental to bad roads and ruts is well distributed and provided for in the various parts.

In carrying my invention into effect the wheel hub is hollowed out for the reception of a metal stepped collar or casting which is held in position by bolts which pass right through a solid portion of the hub, and are provided at each end with collars, washers, and nuts, so that the parts are securely held together. The stepped collars form recesses for the reception of annular bearings or rings which are provided with anti-friction balls, thus reducing the friction to a minimum.

I will now proceed to describe my invention in detail by aid of the two accompanying illustrations, both of which are substantially similar in their essential parts, but are applicable respectively for heavy or for light vehicles.

In the accompanying drawings—Figure 1 is a sectional side elevation of the portions which fit into the hub, and an external view of the end of the axle. Fig. 2 is a repetition of Fig. 1 slightly modified for light vehicles.

In each of the illustrations similar letters of reference are used to denote similar or corresponding parts wherever they occur.

In the drawings $a$ is the axle, and is screw threaded at its extremity $b$, and is provided with an end nut $c$ and binds the annular ball bearing case $d$ against the shoulder portion of the axle at $e$. The axle is also screw threaded at $f$, and is provided with a middle nut $g$, and a lock-nut or washer $h$ which holds the inner ball bearing case $j$ against the shouldered portion $k$ of the axle.

The wheel hub is bored out for the reception of the outer metal stepped collar or casting $m$, and also for the inner metal stepped collar or casting $n$, each of which said castings is flanged or stepped at $o$ as illustrated to form a bed for a removable ball bearing case. The castings are securely held in position by the longitudinal bolts $p$, which are screw threaded at their ends and are provided with ordinary nuts $q$.

In Fig. 1 I have shown an intermediate head $r$ on the longitudinal bolts, which said head impinges upon the inner collar $n$ for the purpose of holding it against the hub of the wheel, an extension of the bolt being provided at $s$ for the purpose of adjusting and securing the inner locking cap $t$, which is provided with a projecting flange $u$, which impinges upon and maintains the inner ball bearing case $j$ in its proper position.

For heavy vehicles I prefer to use the construction shown in Fig. 1 wherein the inner locking cap is maintained by the extended portions of the longitudinal bolts, but for lighter vehicles the cap may be formed with a screw thread at $v$ which fits into a corresponding screw thread in the inner stepped collar, the collar being rotated by an integrally formed nut $w$ as illustrated in Fig. 2 of the drawings.

If the device shown in Fig. 1 is used a leather washer and a metal shield as indicated at $x$ may be added to the device to prevent the intrusion of dust, and may be held in position by a small stud or screw $y$. On the opposite end of the device I provide a dust cap or cover $z$ which may either be held in position by nuts on the ends of the longitudinal bolts, as will be well understood on reference to Fig. 1 of the drawings, or if so desired it may be provided with a screw thread and an integrally formed nut as shown in Fig. 2, whereby it is screwed into the outer metal stepped collar.

It will be understood that the metal stepped collars or castings are drawn up against a solid portion of the hub by means of the longitudinal bolts, and are held firmly against such hub by taking a bearing thereon with that portion of the collar immediately behind the bolt heads or nuts.

Having now particularly described and ascertained the nature of my said invention, and in what manner the same is to be performed, I declare that what I claim is:—

1. In a device of the character described, the combination of a pair of independent collars adapted to be embedded in opposite ends of a wheel hub, each of said collars having an internal shoulder, an axle passing through said collars, and having shoulders in proximity to said collars, a bearing for said axle insertible in each collar and designed to engage the shoulder therein and the adjacent shoulder on the axle, means for securing said bearings in position on the axle, and means normally separable from and engageable with said collars for securing the same in position in a hub.

2. In a device of the character described, the combination of a pair of independent collars adapted to be embedded in opposite ends of a wheel hub, each of said collars having an internal shoulder, an axle passing through said collars and having shoulders in proximity to said collars, a bearing for said axle insertible in each collar and designed to engage the shoulder therein and the adjacent shoulder on the axle, means for securing said bearings in position on the axle, and tie rods engaging said collars to secure the latter in position in a hub.

3. In a device of the character described, the combination of a pair of independent collars adapted to be embedded in opposite ends of a wheel hub, each of said collars having an internal shoulder and an end flange extending substantially at a right angle to the axis of the collar, an axle passing through said collars and having shoulders in proximity to said collars, a bearing for said axle insertible in each collar and designed to engage the shoulder therein and the adjacent shoulder on the axle, means for securing said bearings in position on the axle, and means engaging the flanges of said collars for securing the latter in position in a hub.

4. In a device of the character described, the combination of a pair of independent collars adapted to be embedded in opposite ends of a wheel hub, each of said collars having an internal shoulder and an end flange extending substantially at a right angle to the axis of the collar, an axle passing through said collars and having shoulders in proximity to said collars, a bearing for said axle insertible in each collar and designed to engage the shoulder therein and the adjacent shoulder on the axle, means for securing said bearings in position on the axle, and tie rods engaging the flanges of said collars for securing the latter in position in a hub.

5. In a device of the character described, the combination of a pair of independent collars adapted to be embedded in opposite ends of a wheel hub, each of said collars having an internal shoulder, an axle passing through said collars and having shoulders in proximity to said collars, a bearing for said axle insertible in each collar and designed to engage the shoulder therein and the adjacent shoulder on the axle, means for securing said bearings in position on the axle, means engaging said collars for securing the same in position in a hub, and a locking cap adjacent one of said collars and having means pressing the bearing in said collar against the shoulder in the latter.

6. In a device of the character described, the combination of a pair of independent collars adapted to be embedded in opposite ends of a wheel hub, each of said collars having an internal shoulder, an axle passing through said collars and having shoulders in proximity to said collars, a bearing for said axle insertible in each collar and designed to engage the shoulder therein and the adjacent shoulder on the axle, means for securing said bearings in position on the axle, tie rods engaging said collars to secure the latter in position in a hub, and a locking cap adjacent one of said collars and having projections pressing the bearing in said collar against the shoulder in the latter, said cap being engaged near its periphery by said tie rods.

7. In a device of the character described, the combination of a pair of independent collars adapted to be embedded in opposite ends of a wheel hub, each of said collars having an internal shoulder, an axle passing through said collars and having shoulders in proximity to said collars, a bearing for said axle insertible in each collar and designed to engage the shoulder therein and the adjacent shoulder on the axle, means for securing said bearings in position on the axle, tie rods engaging said collars to secure the latter in position in a hub, a locking cap adjacent one of said collars and having projections pressing the bearing in said collar against the shoulder in the latter, said cap being engaged near its periphery by said tie rods, a metal shield and a flexible washer carried by said cap, and means for adjustably securing said shield and cap in position.

In testimony whereof I have affixed my signature in presence of two witnesses.

JULES ELIE MEYLAN.

Witnesses:
JOHN HERBERT COOKE,
HARRY LAYCOCK.